F. A. GIBSON.
COUPLING.
APPLICATION FILED JUNE 4, 1921.
1,404,595.
Patented Jan. 24, 1922.
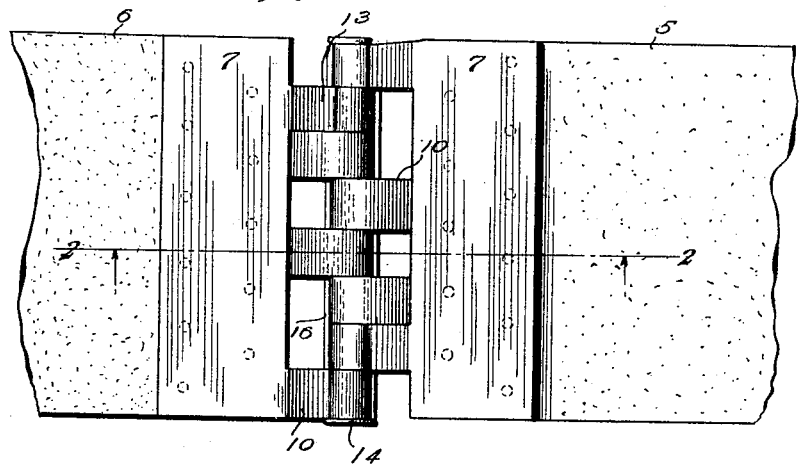
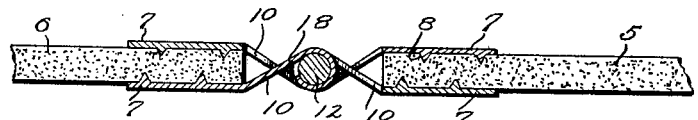
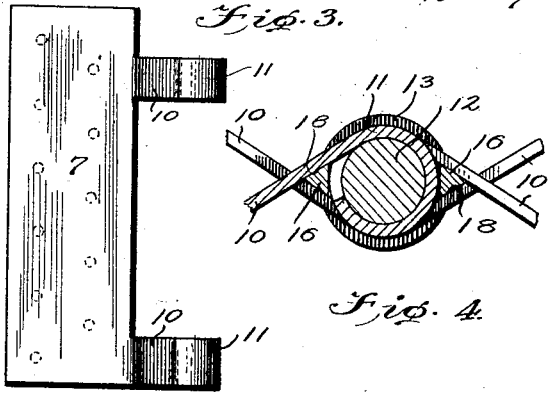
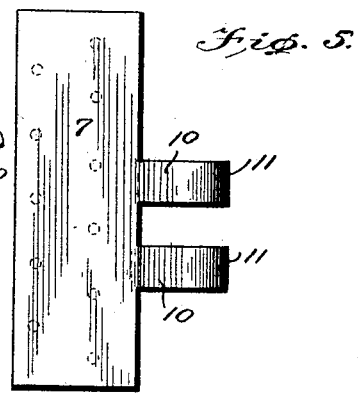
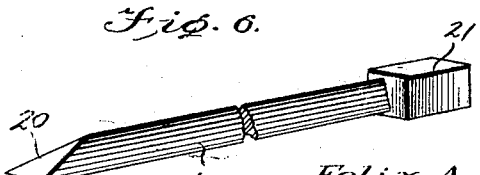
WITNESSES
INVENTOR
Felix A. Gibson,
BY
ATTORNEYS

UNITED STATES PATENT OFFICE.

FELIX A. GIBSON, OF JUPITER, FLORIDA.

COUPLING.

1,404,595.   Specification of Letters Patent.   Patented Jan. 24, 1922.

Application filed June 4, 1921. Serial No. 474,950.

*To all whom it may concern:*

Be it known that I, FELIX A. GIBSON, a citizen of the United States, and a resident of Jupiter, in the county of Palm Beach and State of Florida, have invented certain new and useful Improvements in Couplings, of which the following is a specification.

This invention relates to couplings especially adapted for connecting the ends of a belt or the like.

An important object of this invention is to provide a belt coupling having novel means whereby the same may be readily and conveniently attached to the ends of a belt in such a manner that the ends of the belt are not mutilated or punctured.

A further object of the invention is to provide a coupling having clamping sections which are constantly urged into engagement with the ends of the belt so as to prevent the accidental disconnection of the sections from the belt.

A further object is to provide simple means whereby one end of the belt may be disconnected from the coupling when it is desired to shorten the belt or remove the same for any reason.

Other objects and advantages of the invention will be apparent during the course of the following description.

In the accompanying drawing, forming a part of this application and in which like numerals are employed to designate like parts throughout the same, Figure 1 is a side elevation of the improved coupling applied.

Figure 2 is a horizontal sectional view taken on line 2—2 of Figure 1.

Figure 3 is an elevation of a clamping section embodied in the invention.

Figure 4 is an enlarged detail sectional view through the coupling, the view illustrating the clamping section in engagement with the belt.

Figure 5 is a side elevation of another clamping section embodied in the invention.

Figure 6 is a perspective of a wedge or pin embodied in the invention.

In the drawing, wherein for the purpose of illustration is shown the preferred embodiment of the invention, the numerals 5 and 6 designate the meeting ends of a belt which may be of any desired construction and employed for any purpose.

The improved coupling includes pairs of spaced clamping plates or sections 7 which are adapted to be arranged on opposite sides of one end of the belt so that the cone shaped tongues or anchoring devices 8 formed on the inner side of the same will be imbedded in the belt. However, as illustrated in Figure 2, the cone-shaped projections or tongues 8 do not extend through the belt and therefore do not mutilate the same. The tongues or anchoring devices 8 are arranged in parallel rows and the tongues of each row are staggered with relation to the tongues in the other row so as to provide a strong grip on the belt. The opposed sides of the clamping sections 7 and the belt may be roughened so that slipping of the same apart will be prevented.

The pairs of sections 7 which constitute jaws adapted for the reception of the ends of the belt are provided along their edge portions with extensions or arms 10 which are formed with ears 11 adapted for the reception of a hinge bolt 12. As illustrated in Figure 1, the hinge bolt 12 passes through the aligned ears 11 and has a head 13 which contacts with one of the end ears 11 so that the inward movement of the hinge bolt is limited. It might be stated that the other end of the hinge bolt is interiorly screw threaded and receives the threaded shank of a retaining member 14 preferably in the form of a screw bolt.

The extensions 10 formed along the edges of the section 7 are arranged in pairs, and are inclined so that they will cross the adjacent extensions of the other sections thereby forming a pair of vertical passages or openings 18 on opposite sides of the hinge bolt 12. With reference to Figure 4 it will be observed that the adjacent portion of the extensions 10 and the intermediate portions of the ears 11 form a pair of openings which are triangular in cross section so as to receive retaining pins or wedges 16.

In applying the improved coupling to a belt, the pairs of sections 11 are arranged on opposite sides of the ends of the belt and are subsequently engaged with the opposite sides of the belt by hammering or by any other suitable means. When the sections 7 are firmly engaged with the opposite sides of the belt the wedges 15 are driven into the openings 18 formed by the adjacent portions of the extensions 10 and the adjacent portions of the ears 11. When the wedges 15 are driven through the opening 18, the sections 7 are drawn together so as to be more firmly engaged with the belt. As the pointed end 20 of the pivot pin 16 is driven through the openings the metallic plates 7 will be engaged with the belt in such a manner that the continued use of the coupling will not loosen the connection. Each wedge pin 16, of which there are two, is formed with a head 21 which is engaged by the head of the screw bolt or retaining device 14 so that the wedge will not become disconnected from the coupling. The use of the wedge 16 does not interfere with the flexibility of the coupling or in any way impair its utility.

When desired, one end of the belt may be disconnected from the belt by removing one of said wedge pins and separating the sections 7. While one end of the belt is disconnected from the coupling, the same may be shortened or the belt may be moved and when it is desired to re-connect the belt, the jaws 7 may be engaged with the free end of the same.

Having thus described my invention what I claim is:—

1. A belt coupling comprising pairs of flat metallic plates having attaching means, and a hinge bolt connecting the plates, and means to urge the pairs of plates together.

2. A belt coupling comprising pairs of flat metallic sections having extensions provided with aligned ears, a hinge bolt passed through said ears, the adjacent portions of said extensions being crossed to define openings on opposite sides of said hinge bolt, and wedge pins passed through said openings and urging the sections of said pairs of sections together.

3. A coupling comprising pairs of flat metallic sections having anchoring means, the edges of said sections being provided with obliquely arranged extensions formed with ears, a hinge bolt passed through said ears and having a head, adjacent portions of said extensions being crossed thereby co-operating with the ears and defining openings on opposite sides of said ears, and retaining devices passed through said openings.

4. A coupling comprising pairs of metallic sections having extensions formed with ears, a hinge bolt passed through said ears, and means adjacent said ears for urging the pairs of sections together.

5. A belt coupling comprising pairs of sections having attaching means, said sections being provided along their adjacent edges with extensions having their end portions formed with aligned ears, the edges of said extensions being in contact with the adjacent extensions, a hinged bolt passing through said ears, the adjacent portions of said extensions being crossed thereby co-operating with the ears in forming openings on opposite sides of said ears, wedge pins passing through said openings and having heads and a retaining device connected to the forward end of said bolt and engaging the ends of said wedge pin.

FELIX A. GIBSON.